US010409648B1

(12) United States Patent
Bhatia et al.

(10) Patent No.: US 10,409,648 B1
(45) Date of Patent: Sep. 10, 2019

(54) SPLITTING PROCESSING RESPONSIBILITY FOR SEPARATELY STORED DATA PARTITIONS

(71) Applicant: Amazon Technologies, Inc., Seattle, WA (US)

(72) Inventors: Sandeep Bhatia, Bothell, WA (US); VamsiKrishna Chaitanya Manchem, Kirkland, WA (US); Ming-Chuan Wu, Bellevue, WA (US); Kanishka Chaturvedi, Seattle, WA (US); Kimi Shah, Seattle, WA (US); Andrew Whitaker, Seattle, WA (US); Maruthi Manohar Reddy Devarenti, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 15/447,014

(22) Filed: Mar. 1, 2017

(51) Int. Cl.
*G06F 9/46* (2006.01)
*G06F 9/50* (2006.01)

(52) U.S. Cl.
CPC .......... *G06F 9/5077* (2013.01); *G06F 9/5016* (2013.01); *G06F 9/5083* (2013.01); *G06F 2209/501* (2013.01)

(58) Field of Classification Search
None
See application file for complete search history.

(56) References Cited

U.S. PATENT DOCUMENTS

| 9,720,991 | B2 | 8/2017 | Kritchko et al. |
| 9,740,762 | B2 | 8/2017 | Horowitz et al. |
| 9,805,108 | B2 | 10/2017 | Merriman et al. |
| 2014/0040580 | A1 | 2/2014 | Kripalani |
| 2015/0134626 | A1* | 5/2015 | Theimer ........... G06F 17/30289 707/693 |

OTHER PUBLICATIONS

U.S. Appl. No. 14/452,587, filed Mar. 7, 2017, Wu et al.

* cited by examiner

*Primary Examiner* — Bing Zhao
(74) *Attorney, Agent, or Firm* — Robert C. Kowert; Meyertons, Hood, Kivlin, Kowert & Goetzel, P.C.

(57) ABSTRACT

Processing responsibility for a data set may be split according to separately stored partitions of the data set. A data set may be stored in different storage units that separately store different partitions of the data set. Mapping information may be maintained indicating the assignment of a node to process access requests to multiple partitions of a data set. A split event may be detected for the node, and one or more partitions assigned to the node may be reassigned to a different node. The storage units for the reassigned partitions may be made accessible to the different node. Then mapping information can be updated to indicate change in assignment from the original node to the different node so that the different node can begin processing access requests for the reassigned partitions.

18 Claims, 10 Drawing Sheets

SPLITTING PROCESSING RESPONSIBILITY FOR SEPARATELY STORED DATA PARTITIONS

BACKGROUND

In order to respond to changing conditions or workloads, various kinds of processing environments may rely upon scale out techniques to distribute work amongst multiple nodes. For example, as the demands upon various processing resources of a single node increase beyond the capacity of the node to perform according to a desired standard, an additional node may take over some of the workload from the original node so that the performance standard may be maintained. Given that scale out techniques may be widely applicable, improvements to the performance of such techniques are desirable.

Figure 1:
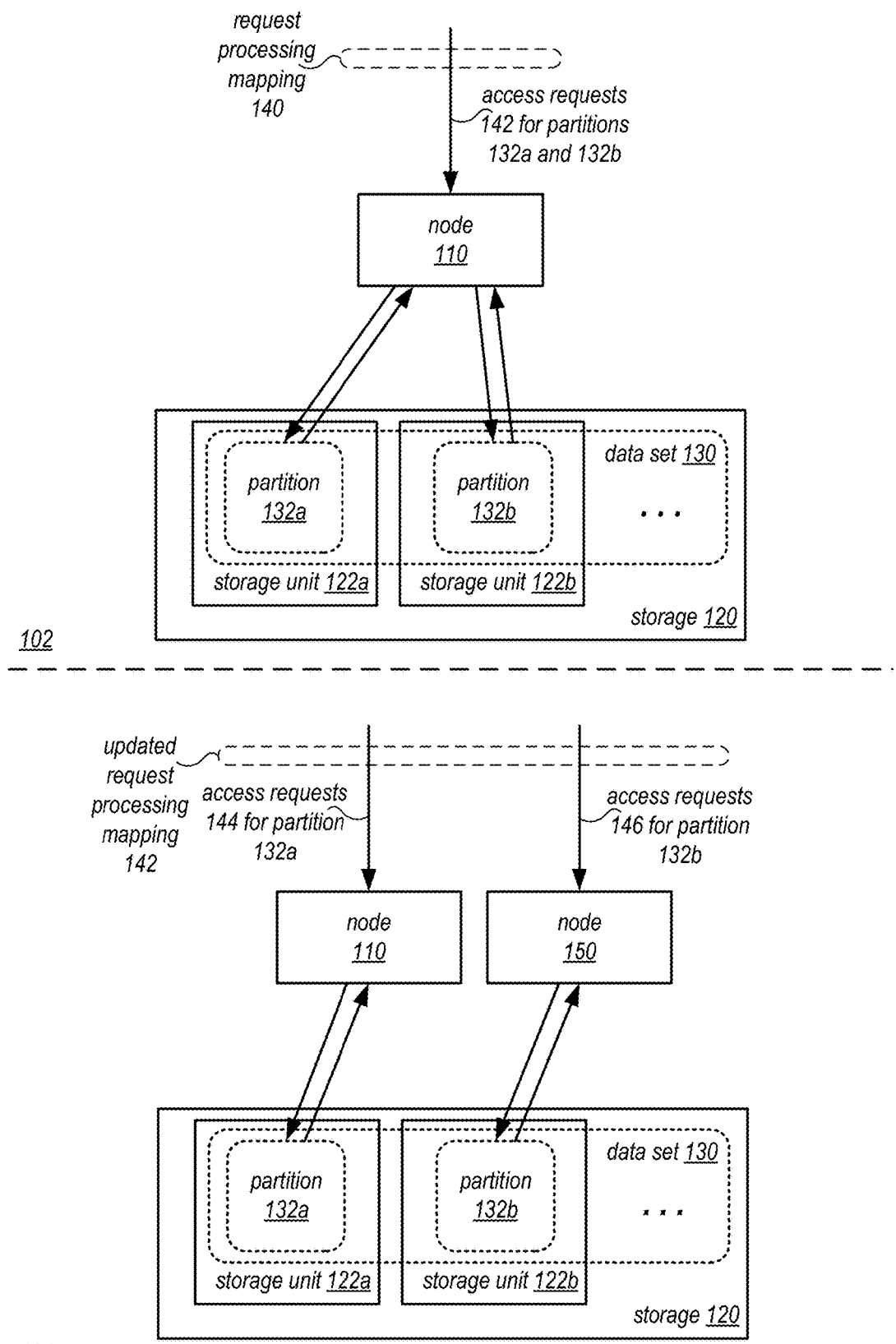
FIG. 1 is a series of logical block diagrams illustrating splitting processing responsibility for separately stored data partitions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to split processing responsibility for separately stored data partitions, according to some embodiments. In one embodiment, implementing scale out techniques occurs when a node is responsible for processing, managing, or otherwise providing access to a data set. In one embodiment, requests to access the data set, such as requests to read data from or write data to the data set, may be handled by a node that is designated or otherwise assigned to process requests for the data set. When this node becomes unable to meet a desired performance standard (or is proactively or preemptively selected for splitting responsibility), the data set itself may be split in order to effect a split in processing responsibility, in one embodiment, by assigning a new node to process access requests for the split portion of the data set.

In one embodiment, scale out techniques for processing access requests to a data set are performed as needed. The original node (or nodes) processing access requests to the data set treat the data set as a whole. In one embodiment, the organization or arrangement of the data in the data set in storage may be implemented in various ways, none of which may impact the operation original node (as long as the data set of the data can be accessed). For example, in one embodiment where the data set is a database organized into various tables, the data from different tables may be treated as logically separate by the node when processing access requests, and yet the data of the different tables may be comingled in the underlying storage without impact the ability of the node to process access requests. However, in order to split the data set to reassign processing responsibility to another node, data corresponding to a logical portion of the data set that is reassigned may need to be found or identified in storage by the node (which understands which data belongs to the logical portion of the data set). Consider the example of data from different tables comingled together given above. The node processing requests to access the database, in that embodiment, may understand which data belongs to each table, but in order to split off a table, the node may have to scan or otherwise read all of the data in storage in order to find the data that belongs to the table. Such an operation can introduce significant latency into the scale out operation to split processing responsibility from the node and increases the workload of the node (as the node has to perform the work to identify which data belongs to the portion of the data set being split off), which may exacerbate a situation which led to the scale out operation to begin with—an overburdened node.

In various embodiments, splitting processing responsibility for separately stored partitions may be implemented to reduce the burden caused by split operations for processing access requests to data. In one embodiment, partitions of a data set may be defined prior to the occurrence of a scale out operation (instead of being split after a split event occurs) so that the data of the partitions may be stored in separate storage locations. For example, in one embodiment, a shard of a database may include multiple logical groupings of data. One or more of these groupings of data (e.g., a set of items in the database with a field or attribute within a value range)

may be stored in a single unit of storage (e.g., a volume, drive, page, block, etc.) as a partition. In this way, when a split operation occurs, movement of the processing responsibility may be performed without requiring a node to identify and separate out data in the partition from other partitions (e.g., data in the one or more groupings separate from data in other groupings of data in the shard) at the time of the split operation. Moreover, in one embodiment, movement of the processing responsibility may be performed without physically moving the data to a different location (e.g., as a new node may be able to access the storage unit storing the partition at its current location).

FIG. 1 is a series of logical block diagrams illustrating splitting processing responsibility for separately stored data partitions, according to some embodiments. As illustrated in scene 102, node 110 processes access requests 142 for different partitions of data set 130, partitions 132a and 132b, in one embodiment. These partitions may be stored in separate storage units 122a and 122b respectively of storage 120. The partitions of data set 130 may be determined according to a logical partitioning scheme. For example, in one embodiment, partitions may correspond to individual tables of a database or portions of tables in a database (e.g., where each portion of the table is identified by the contents of items within the table, such as rows of the table that include a date field with the same month or year). In one embodiment, the logical partitioning scheme may include determining or assigning a partition key to data as it is stored in the data set. For example, a hash function can be applied to an item value, in one embodiment, in order to generate a partition key. The partition key may then be used to assign the item to a partition (e.g., partition A includes partition keys 1 to 9999, partition B includes partition keys 10000 to 19999, and so on). When data is added to the data set, the data may be stored in the storage unit that exclusively stores the partition identified for the data according to the logical partitioning scheme, in one embodiment. In this way, the data of different partitions of the data set is not comingled with (and thus isolated from) the data of other partitions of the data set, being separately stored in different storage units.

Node 110 may be any kind of processing engine, storage engine, compute node, or system, such as computer system 1000 discussed below with regard to FIG. 10, in one embodiment. For example, node 110 may be a storage engine node for a database, in one embodiment as discussed below with regard to FIG. 3, or a compute instance, in a different embodiment as discussed below with regard to FIG. 6. In one embodiment, node 110 may implement a storage engine, driver, or other component that is responsible for interfacing with storage 120. For example, node 110 may implement a storage engine, in one embodiment, that communicates with storage 120 according to a network storage protocol, like Internet Small Computer Systems Interface (iSCSI). In one embodiment, node 110 may identify the storage units that store the different partitions of data set 130 for which it is responsible for processing access requests to. For instance, node 110 may maintain pointers, references, or virtual addresses for storage unit 122a and 122b, in one embodiment, so that when access to the partition is required to service an access request, node 110 can access the partition to service the request using the pointer, reference, or virtual address. In at least one embodiment, node 110 may identify the storage units that store the different partitions of data set 130 by establishing a network connection with storage 120 and attaching, mounting, or otherwise obtaining access to the storage unit.

Storage 120 may be implemented as various kinds of persistent or volatile storage systems. For example, storage 120 may be implemented, in one embodiment, using one or more multiple hard disk storage devices or solid state flash devices to persistently store data in block-based format. In another embodiment, storage 120 may be implemented using one or more memory devices, such as random access memory (RAM). In one embodiment, storage units 122 may be a volume, storage device partition, data structure, object, file, data page, data block, collection of storage locations, or any other entity that may be separately managed by storage 120 to provide access to the data stored within storage units. Storage 120 may be implemented according to a shared nothing storage architecture, in an embodiment, as discussed below with regard to FIG. 4 or a shared disk storage architecture, in another embodiment as discussed below with regard to FIG. 5. In an embodiment, storage 120 may be host system storage, on-board storage, or other storage internal to a system or service implementing node 110. In another embodiment, storage 120 may be a storage system that is external to a system or service implement node 110, such as data storage service 220 discussed below with regard to FIG. 2.

Request processing mapping 140 may be mapping or other assignment information that describes the processing assignments of nodes and partitions, in one embodiment. For instance, request processing mapping 140 in scene 102 may indicate that node 110 is assigned to process access requests for partitions 132a and 132b. In one embodiment, request processing mapping 140 may be maintained by a request routing layer (e.g., routing servers or other networking devices that intercept access requests for data set 130). In one embodiment, request processing mapping 140 may be maintained or enforced by request processing nodes, such as node 110.

A split event may be detected for node 110 in various ways. In one embodiment, split events may be manually requested (e.g., by receiving a request to split processing at node 110 from a client of node 110). Split events may be automatically detected, in one embodiment. For example, performance metrics for node 110 may be collected to determine whether node 110 satisfies performance characteristics or criteria. A maximum utilization threshold for processor utilization of node 110 could be monitored based on the performance metrics. If the maximum utilization threshold is exceeded, then a split event may be triggered for node 110, in one embodiment.

Once triggered an evaluation may be performed to determine or select the partition(s) to reassign from node 110, in one embodiment. Random partition selection may be implemented in one embodiment, while in another embodiment deterministic techniques may be performed to select the partition to reassign. For example, metrics collected for individual partitions may be evaluated to select a most accessed partition (or a group of partitions that are accessed collectively as much as the most access partition) to reassign.

As illustrated in scene 102, processing at node 110 has been split. Node 150 has been added to handle access requests 146 for partition 132b, in one embodiment. In order to reassign partition 132b, storage unit 122b has been made accessible to node 150. For example, in one embodiment, storage unit 122b was mounted or attached to node 150 or otherwise identified to node 150. In another embodiment, storage unit 122b may be identified to node 150 by providing the pointer, reference, or virtual address of storage unit 122b to node 150. Request processing mapping 142 was updated to map the assignment of partition 132*b* to node 150 after the storage unit 122*b* was made accessible to node 150, in one embodiment.

Please note that previous descriptions of splitting processing responsibility of separately stored data partitions are not intended to be limiting, but are merely provided as logical examples. Different implementations of storage node 120 or node 110 may be conceived. For example, instead of a single node a cluster of multiple nodes may be implemented to handle processing responsibility for data set 130, in one embodiment. Although not illustrated in FIG. 1, in some embodiments, multiple sub-partitions or groups of data in a data set may be treated together as a single partition that are stored in a single storage unit.

This specification begins with a general description of different network-based services that may implement splitting processing responsibility for separate data partitions, in one embodiment. Then various examples of a database service and compute service are discussed, including different components/modules, or arrangements of components/module, that may be employed as part of implementing the database service, in one embodiment, and compute service in another embodiment. A number of different methods and techniques to implement splitting processing responsibility for separate data partitions are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
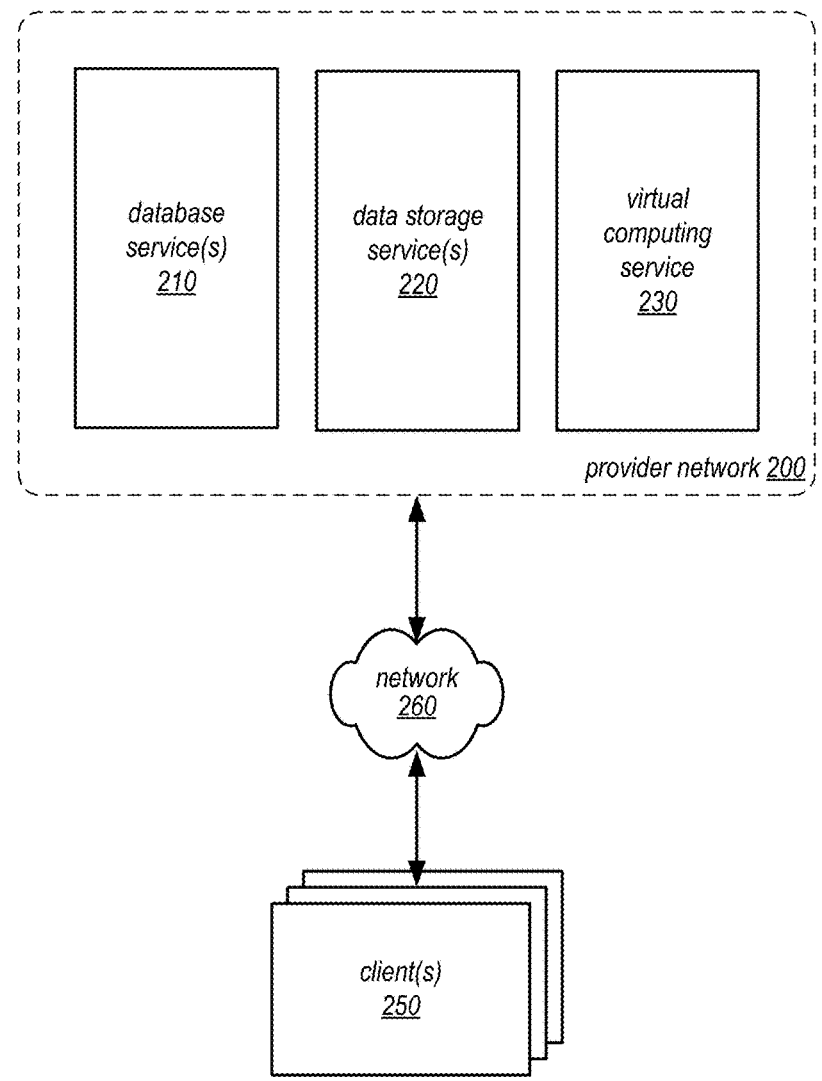
FIG. 2 is a logical block diagram illustrating a provider network implementing different network-based services that may split processing responsibility for separately stored data partitions, according to some embodiments.

FIG. 2 is a logical block diagram illustrating a provider network offering a data storage service serving as a centralized data store for multiple data processing services, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In one embodiment, provider network 200 may implement various computing resources or services, such as database service(s) 210 or other data processing (e.g., relational or non-relational (NoSQL) database query engines, map reduce processing, data warehouse, data flow processing, and/or other large scale data processing techniques), data storage service 220 (e.g., an object storage service, block-based storage service, or data storage service that may store different types of data for centralized access), and virtual compute service 230, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

Data storage service(s) 220 may implement different types of data stores for storing, accessing, and managing data on behalf of clients 250 as a network-based service that enables clients 250 to operate a data storage system in a cloud or network computing environment, in one embodiment. Data storage service(s) 220 may store data sets (e.g., databases) for other services, like database service(s) 210, in one embodiment. For example, one data storage service 220 may be implemented as a centralized data store so that other data services may access data stored in the centralized data store for processing. Data storage service(s) 220 may provide storage and access to various kinds of object or file data stores for putting, updating, and getting various types, sizes, or collections of data objects or files, in some embodiment. Such data storage service(s) 220 may be accessed via programmatic interfaces (e.g., APIs) or graphical user interfaces, in one embodiment. In one embodiment, data storage service(s) 220 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Virtual computing service 230 may provide client(s) 250 with access to computing resources, in one embodiment, which may be referred to as virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the virtual computing service 230 in different embodiments, including general purpose or special purpose computer servers, storage devices, network devices and the like. In one embodiment client(s) 250 or user may be provided direct access to a compute instance, e.g., by giving a user an administrator login and password. Compute instances may operate or implement a variety of different platforms, in one embodiment, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance.

Compute instances may be many different types or configurations based on several different dimensions in one embodiment, (and pricing policies associated with different classes may differ. Compute instances, in one embodiment, may be classified based in part on the timing or duration of instance allocations—i.e., on when instances are obtained by clients and when they are released by the clients, such as reserved instances, on-demand instances and spot-instances each with respective pricing policies. In one embodiment, reserved compute instances may be reserved for fairly long periods, such as a one-year term or a three-year term in accordance with the pricing policy, by paying a low, one-time, upfront payment for the instance, and then paying a low hourly rate for actual use of the instance at any desired times during the term of the reservation. Thus, a client 250 that reserved a reserved instance may, by making the long-term reservation, be assured that its reserved instance will be available whenever it is needed.

For those clients 250 that do not wish to make a long-term reservation, the client may instead opt to use on-demand instances (or spot instances), in one embodiment. The pricing policy for on-demand instances may allow the client 250 to pay for resource capacity by the hour with no long-term commitment or upfront payments, in one embodiment. In one embodiment, the client 250 may decrease or increase the resource capacity used, based on application needs, and may only have to pay the hourly rate for the instances used. In some cases the per-hour pricing for on-demand instances may be higher than the hourly rate for reserved compute instances, because the relatively long durations of reservations may provide a more stable revenue stream to the operator of the provider network than the potentially more dynamic revenue stream provided by on-demand instances. Spot instances may provide a third type of resource purchasing and allocation model, in one embodiment. For example, a spot pricing policy may allow a client 250 to specify the maximum hourly price that the client 250 is willing to pay, and the virtual compute service 230 may set a spot price for a given set of available compute resources dynamically based on the prices clients are willing to pay and on the number of instances available to support the spot model. If a client's bid meets or exceeds the current spot price, an instance may be allocated to the client 250. If the spot price rises beyond the bid of the client 250 using a spot instance, access to the instance by the client 250 may be revoked (e.g., the instance may be shut down).

In one embodiment, compute instances have different types or configurations based on expected uptime ratios. The uptime ratio of a particular reserved compute instance may be defined as the ratio of the amount of time the instance is activated, to the total amount of time for which the instance is reserved, in one embodiment. Uptime ratios may also be referred to as utilizations in one embodiment. For example, if a client expects to use a reserved compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If, in another example, the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in one embodiment as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems) in one embodiment. In one embodiment, compute instances may act as consumption resources for data sets purchased via data set marketplace. Size of compute instances, such as a particular number of virtual CPU cores, memory, cache, storage, as well as any other performance characteristic may vary, in one embodiment. Configurations of compute instances may also include their location, in a particular data center, availability zone, geographic, location, etc. . . . and (in the case of reserved compute instances) reservation term length, in one embodiment. The previous descriptions is not intended to be limiting, but merely illustrative of the many different configurations possible for a compute instance provided by virtual computing service 230.

In one embodiment, clients 250 may encompass any type of client configurable to submit network-based requests to provider network 200 via network 260, including requests for database service(s) 210 (e.g., to query a database 210) or data storage service(s) 220 (e.g., a request to create, read, write, obtain, or modify data in data storage service(s) 220, etc.). For example, in one embodiment a given client 250 may include a suitable version of a web browser, or may include a plug-in module or other type of code module configured to execute as an extension to or within an execution environment provided by a web browser. Alternatively in a different embodiment, a client 250 may encompass an application such as a database application (or user interface thereof), a media application, an office application or any other application that may make use of storage resources in data storage service(s) 220 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200, in one embodiment. In one embodiment, client 250 may be configured to generate network-based services requests according to a Representational State Transfer (REST)-style network-based services architecture, a document- or message-based network-based services architecture, or another suitable network-based services architecture.

In one embodiment, a client 250 may be configured to provide access to provider network 200 to other applications in a manner that is transparent to those applications. For example, client 250 may be configured to integrate with an operating system or file system to provide storage on one of data storage service(s) 220 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 220 may be coordinated by client 250 and the operating system or file system on behalf of applications executing within the operating system environment.

Clients 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in one embodiment, clients 250 may communicate with provider network 200 using a private network rather than the public Internet.

Figure 3:
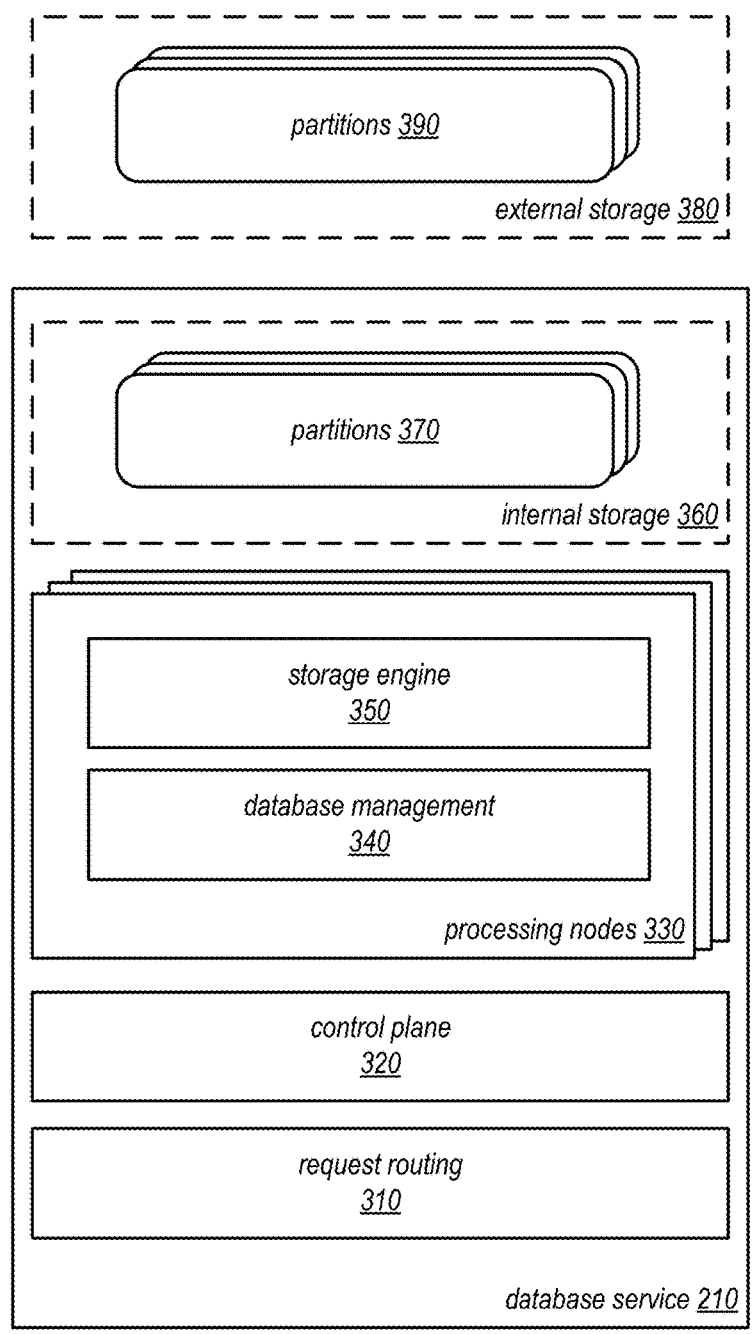
FIG. 3 is a logical block diagram of a database service that may split processing responsibility for separately stored data partitions of a database, according to some embodiments.

FIG. 3 is a logical block diagram of a database service that may split processing responsibility for separately stored data partitions of a database, according to some embodiments. Database service 210 may implement request routing 310, in one embodiment. Request routing may be configured to receive, authenticate, parse, throttle and/or dispatch service requests, among other things, in one embodiment. In one embodiment, database service 210 may implement control plane 320 to implement one or more administrative components, such as automated admin instances which may be configured to provide a variety of visibility and/or control functions, as described in more detail herein). In one embodiment, database service 210 may also implement a plurality of processing nodes 330, each of which may manage one or more partitions 370 of a data set (e.g., a database) on behalf of clients/users or on behalf of the data storage service (and its underlying system) which may be stored in internal storage 360 (on storage devices attached to processing nodes 330) or, in another embodiment, one or more partitions 390 in external storage 380 which may be accessed by processing nodes 330 (e.g., via network connections).

Control plane 320 may provide visibility and control to system administrators, detect split events for processing nodes, and/or anomaly control, resource allocation, in one embodiment. In one embodiment, control plane 320 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 320 may provide an interface or access to information stored about one or more detected control plane events, such as split requests to be processed, at storage service 230, in one embodiment.

Control plane 320 may be configured to direct the performance of different types of control plane operations among the nodes, systems, or devices implementing database service 210, in one embodiment. For instance, control plane 320 may be configured to communicate with processing nodes to initiate the performance of various control plane operations, such as moves, splits, update tables, delete tables, create indexes, etc. . . . In one embodiment, control plane 320 may be configured to update a task registry (or some other table or data structure) with the status, state, or performance information of the control plane operations currently being performed.

In one embodiment, request routing 310 may support handling requests formatted according to an interface to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, database service 210 may be configured to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, request routing 310 may perform parsing and/or throttling of service requests, authentication and/or metering of service requests, dispatching service requests, and/or maintaining a partition assignments that map processing nodes to partitions.

Processing nodes 330 may implement database management 340, in one embodiment. Database management 340 may create, update, define, query, and/or otherwise administer databases, in one embodiment. For instance, database management 340 may maintain a database according to a database model (e.g., a relational or non-relational database model). In one embodiment, database management 340 may allow a client to manage data definitions (e.g., Data Definition Language (DDL) requests to describe column definitions, requests to add item attributes, etc.). In one embodiment, database management 340 may handle requests to access the data (e.g., to insert, modify, add, or delete data as well as requests to query for data by generating query execution plans to determine which partitions of a database may need to be evaluated or searched in order to service the query). In one embodiment, database management 340 may also perform other management functions, such as enforcing access controls or permissions, concurrency control, or recovery operations. In one embodiment, database management 340 may send requests to storage engine 350 to access partitions in order to process access requests (e.g., requests to read or scan different partitions or particular items or parts of data within a partition).

In one embodiment, processing nodes 330 may implement storage engine 350 to access either internal storage 360 and/or external storage 380. Storage engine 350 may perform requests on behalf of database management to create, read, update and delete (CRUD) data in a partition, in one embodiment. Storage engine 350 may implement buffers, caches, or other storage components to reduce the number of times storage is accessed, in one embodiment. After reassignment of a partition from one node or storage engine to another node or storage engine, the storage engine 350 may only have to retain those data pages that are taken from the storage unit maintaining the partition assigned to the storage engine 350, in one embodiment. In this way, storage engine 350 need not maintain data pages that include data from other partitions not assigned to the storage engine 350. Storage engine 350 may implement various storage interfaces to access internal storage 360 or external storage 380. For example, in those embodiments where external storage is a network-based data storage service, like data storage service 220 in FIG. 2, then storage engine 350 may be configured to establish a network connection with external storage 380 as part of obtaining access to a storage unit (e.g., by submit requests formatted according to a protocol or API to establish the connection). In another embodiment, storage engine 350 may access internal storage 360 using storage protocols (e.g., Small Computer Systems Interface (SCSI)) over a bus or other interconnect that directly connects a host implementing storage engine 350 with internal storage 360).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

Figure 4:
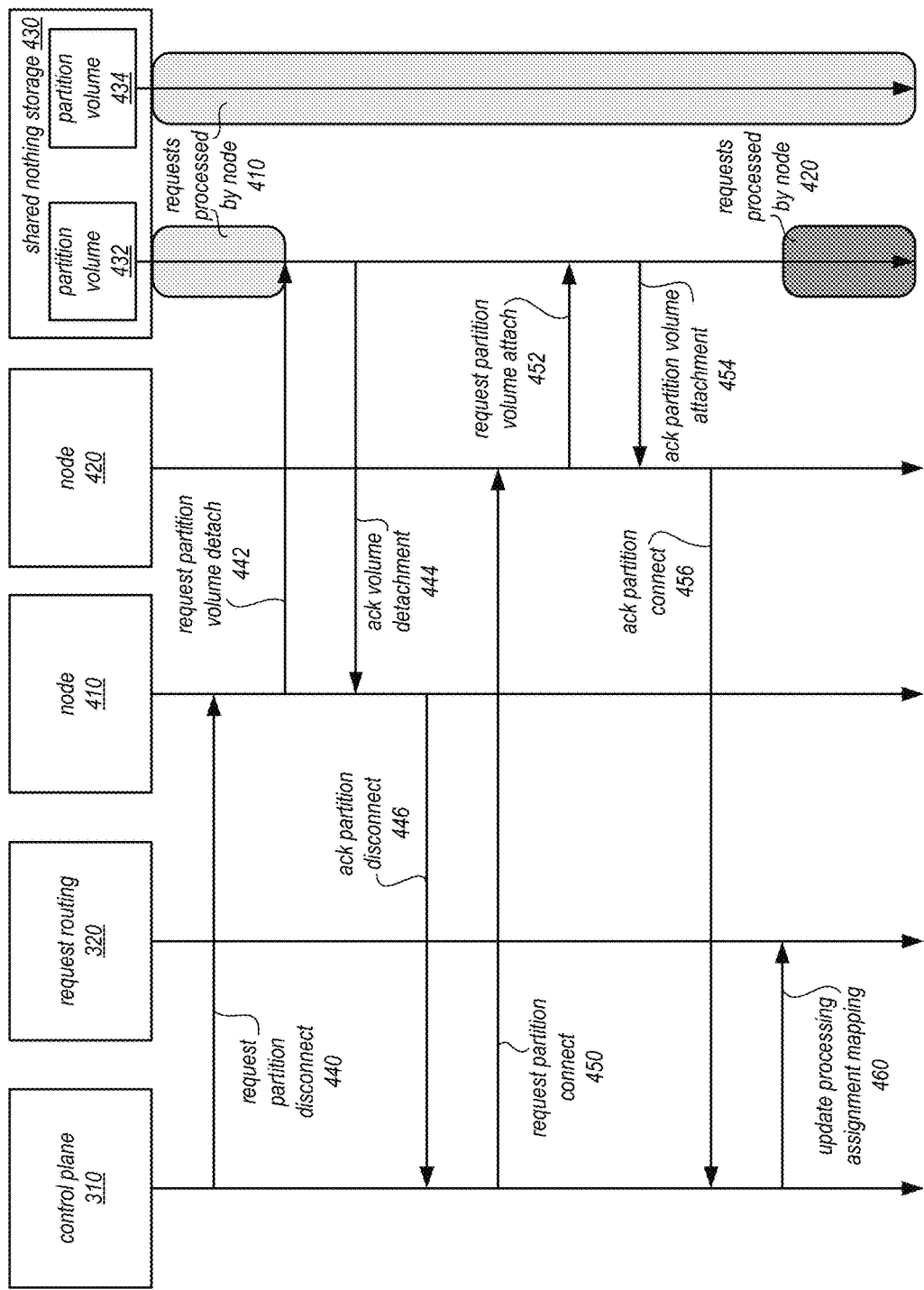
FIG. 4 is a logical block diagram illustrating interactions to split processing responsibility for separately stored data partitions in a shared nothing storage architecture, according to some embodiments.

FIG. 4 is a logical block diagram illustrating interactions to split processing responsibility for separately stored data partitions in a shared nothing storage architecture, according to some embodiments. In a shared nothing storage architecture, partitions may be maintained in a storage unit such as a volume (e.g., partition volumes 432 and 434), in one embodiment, which may be separately maintained such that only a single client may access a volume at a time. Thus, in scenarios like those illustrated in FIG. 4, wherein a split event triggers the reassignment of a partition, such as the partition in partition volume 432 from node 410 to node 420, node 410 may initially be the only storage client permitted to access partition volumes 432 and 434.

As illustrated in FIG. 4, control plane 310 may detect a split event for node 410 and determine the partition to reassign (e.g., the partition in partition volume 432) from processing of access requests, in one embodiment. In one embodiment, control plane 310 may send a request 440 to node 410 to disconnect node 410 from the partition volume 432. In one embodiment, ode 410 may then send a request 442 to detach (or unmount) the partition volume 432 to shared nothing storage 430. The request may be formatted according to an interface for shared nothing storage 430 (e.g., an API). In one embodiment, shared nothing storage 430 may acknowledge the volume detachment 444 to node 410, which in turn may acknowledge the partition disconnect 446 to control plane 310. In one embodiment, control plane 310 may then request that node 420 (provisioned or otherwise procured to serve as a processing node for the reassigned partition), connect 450 with partition volume 432. In one embodiment, node 420 may send a request to shared nothing storage 430 to attach 452 partition volume 432, which shared nothing storage 430 may acknowledge 454. In one embodiment, node 420 may then acknowledge the connection of the partition 456 to control plane 310. Control plane 310 may then send a request to request routing 320 to update processing assignment mapping to indicate that node 420 processes access requests for the partition in partition volume 432, in one embodiment.

Figure 5:
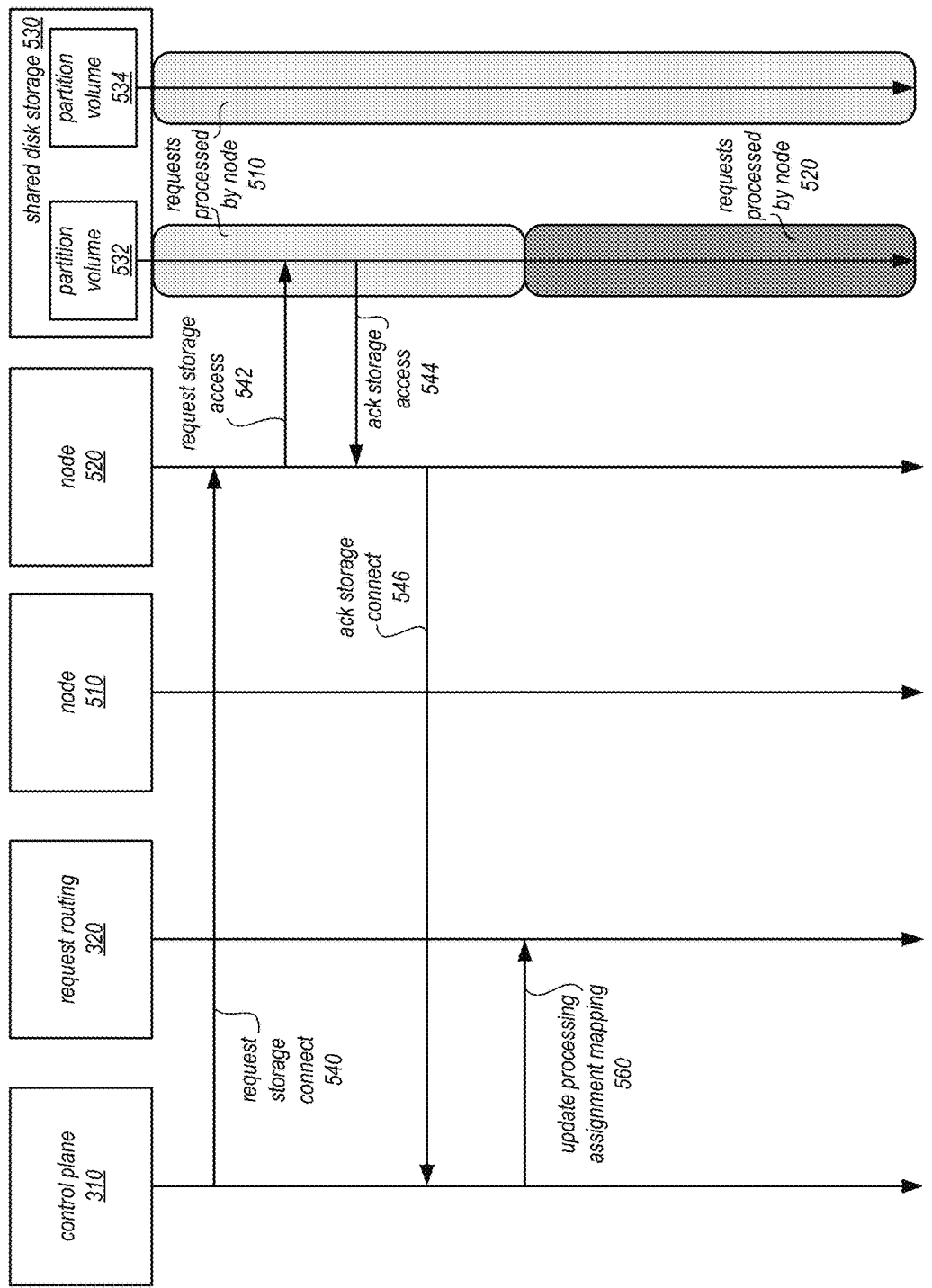
FIG. 5 is a logical block diagram illustrating interactions to split processing responsibility for separately stored data partitions in a shared disk storage architecture, according to some embodiments.

FIG. 5 is a logical block diagram illustrating interactions to split processing responsibility for separately stored data partitions in a shared disk storage architecture, according to some embodiments. In a shared disk architecture, multiple clients may access a same storage unit, in one embodiment. Shared disk architecture may impose consistency guarantees when allowing multiple clients, in one embodiment. Thus, in scenarios like those illustrated in FIG. 5, additional storage nodes may establish a new connection with shared disk storage 530 or may have already established a connection with shared disk storage (e.g., where the node is implemented at a multi-tenant host that has already established a connection service access requests for another partition of another client).

As illustrated in FIG. 5, control plane 310 may detect a split event for node 510 and determine the partition to reassign (e.g., the partition in partition volume 532) from processing of access requests, in one embodiment. Control plane 310 may send a request 540 to node 520 to connect with shared disk storage 530, in one embodiment. Node 520 may then send a request to establish storage access 542 (e.g., according to an interface for shared disk storage, such as an API request), in one embodiment. Shared disk storage 530 may acknowledge the request 544 to node 520, which in turn may acknowledge the established connection to control plane 310, in one embodiment. Control plane 310 may then update processing assignment mapping 560 at request routing 320, in one embodiment. As multiple clients can access partition volumes 532 and 534, requests to partition volume 532 may be processed by node 510 until the change to assignment is made, in one embodiment.

Figure 6:
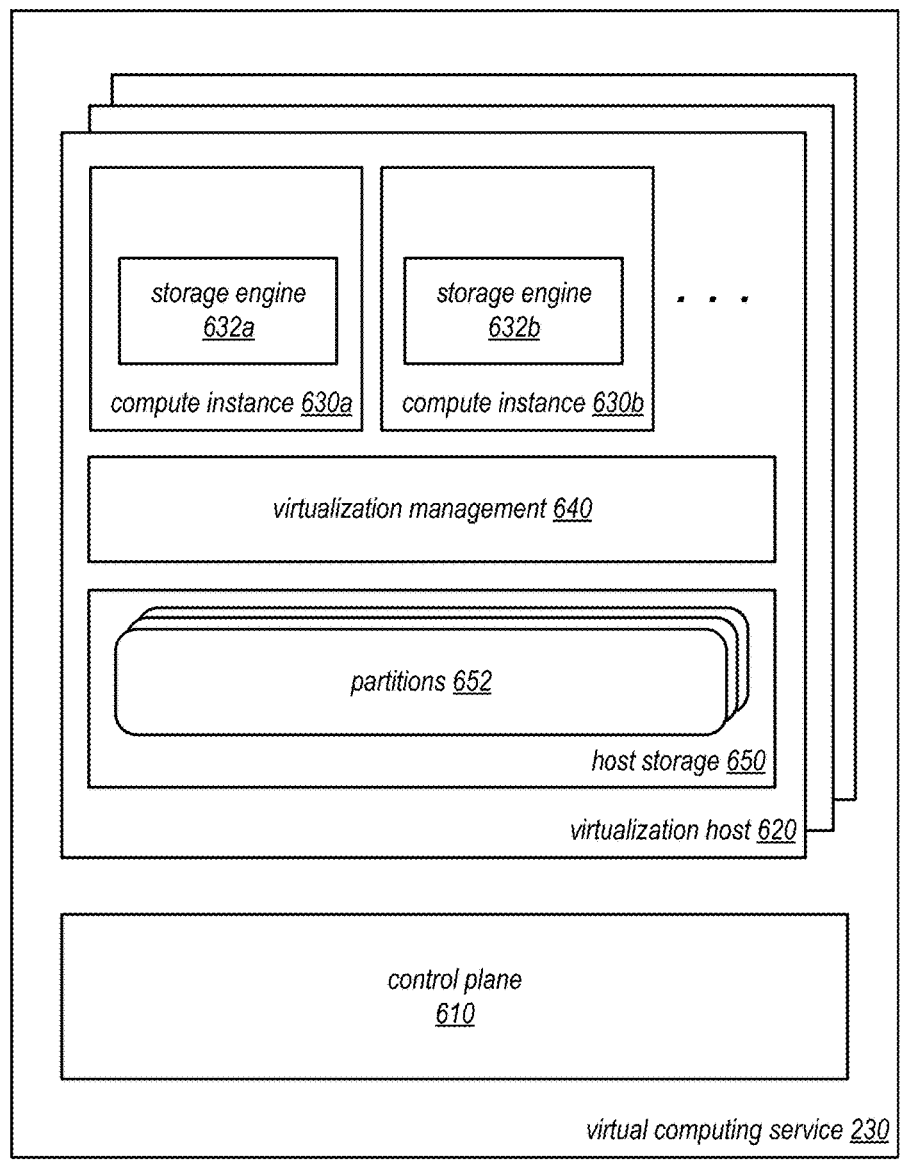
FIG. 6 is a logical block diagram of a virtual computing service that may split processing responsibility for separately stored data partitions, according to some embodiments.

FIG. 6 is a logical block diagram of a virtual computing service that may split processing responsibility for separately stored data partitions, according to some embodiments. Virtual computing service 230 may implement control plane 610 and virtualization hosts 620 to provide virtual compute instances to clients of provider network 200, in one embodiment. In one embodiment, control plane 610 may manage the computing resource offerings provided to clients by virtual computing service 230. Control plane 610 may implement various different components to manage the computing resource offerings, in one embodiment. Control plane 610 may be implemented across a variety of servers, nodes, or other computing systems or devices (such as computing system 1000 described below with regard to FIG. 10), in one embodiment. It is noted that where one or more instances of a given component may exist, reference to that component herein may be made in either the singular or the plural. However, usage of either form is not intended to preclude the other.

In at least one embodiment, control plane 610 may implement an interface. The interface may be configured to process incoming requests received via network 260 and direct them to the appropriate component for further processing. In at least one embodiment, the interface may be a network-based interface and may be implemented as a graphical interface (e.g., as part of an administration control panel or web site) and/or as a programmatic interface (e.g., handling various Application Programming Interface (API) commands). In one embodiment, the interface may be implemented as part of a front end module or component dispatching requests to the various other components, for resource management, reservation management, resource monitoring, or billing. Clients may, in one embodiment, may not directly provision, launch or configure virtual compute instances 630 resources but may send requests to control plane 610 such that the illustrated components (or other components, functions or services not illustrated) may perform the requested actions.

Control plane 610 may manage the access to, capacity of, mappings to, and other control or direction of computing resources offered by provider network, in one embodiment. In at least one embodiment, control plane 610 may provide both a direct sell and $3^{rd}$ party resell market for capacity reservations (e.g., reserved compute instances). For example, control plane 610 may allow clients via an interface to learn about, select, purchase access to, and/or reserve capacity for computing resources, either from an initial sale marketplace or a resale marketplace, via a web page or via an API. For example in another embodiment, control plane 610 may, via an interface, provide a listing of different available compute instance types, each with a different credit accumulation rate. Control plane 610 may also offer and/or implement a flexible set of resource reservation, control and access interfaces for clients via the interface, in one embodiment. For example control plane 610 may provide credentials or permissions to clients such that compute instance control operations/interactions between clients and in-use computing resources may be performed.

In one embodiment, control plane 610 may implement billing management. Billing management may be configured to detect billing events (e.g., specific dates, times, usages, requests for bill, or any other cause to generate a bill for a particular user account or payment account linked to user accounts). In response to detecting the billing event, billing management may be configured to generate a bill for a user account or payment account linked to user accounts, in one embodiment.

A virtual compute instance 630 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor), in one embodiment. A number of different types of computing devices may be used singly or in combination to implement the compute instances 630 of network-based virtual computing service 230 in different embodiments, including general purpose or special purpose computer servers, storage devices, network devices and the like. In one embodiment instance clients or other any other user may be configured (and/or authorized) to direct network traffic to a compute instance 630.

As illustrated in FIG. 6, a virtualization host 620, may implement and/or manage multiple compute instances 630, in one embodiment, and may be one or more computing devices, such as computing system 1000 described below with regard to FIG. 10. A virtualization host 620 may include virtualization management 640, capable of instantiating and managing a number of different client-accessible virtual machines or compute instances 630, in one embodiment. The virtualization management module 640 may include, for example, a hypervisor and an administrative instance of an operating system, which may be termed a "domain-zero" or "dom0" operating system in some implementations. The dom0 operating system may not be accessible by clients on whose behalf the compute instances 630 run, but may instead be responsible for various administrative or control-plane operations of the network provider, including handling the network traffic directed to or from the compute instances 630, in one embodiment.

Virtualization hosts 620 may serve as a host platform for one or more virtual compute instances, in one embodiment. These virtual compute instances may utilize virtualized hardware interfaces to perform various tasks, functions, services and/or applications, in one embodiment. As part of performing these tasks, virtual compute instances may utilize virtualized computer resources (e.g., virtual central processing unit(s) (vCPU(s) or virtual storage) which may act as the virtual proxy for the physical CPU(s)) or physical storage 650 implemented at the virtualization host in order to perform work on respective physical computer resources for the respective compute instance, in one embodiment.

As illustrated in FIG. 6, virtualization host 620 may host compute instances, such as compute instance 630a and compute instance 630b, in one embodiment. In at least one embodiment, the compute instances 630 may be the same type of compute instance. Each compute instance may utilize a storage engine, such as storage engine 632a and storage engine 632b, to access partitions 652 that are stored in separate units of host storage 650 (e.g., different ranges of contiguous storage location within a memory), in one embodiment. As with the examples discussed above with regard to scaling out databases, there may be some scenarios when a common set of information may be utilized by different compute instances, in one embodiment. Splitting processing responsibility of separately stored partitions may be implemented for compute instances or other virtualized resources that share an underlying physical storage (e.g., multiple threads or processes relying upon graphics data, like a Texel, in order to perform graphics processing), in one embodiment. Virtualization host 620 may implement virtualization management 640, which may handle the various interfaces between the virtual compute instances 630 and physical computing resource(s), such as host storage 650, in one embodiment. In at least one embodiment, virtualization management 640 may maintain assignments (e.g., via virtual memory management techniques) of partitions 652 to different compute instances. In order to reassign a partition 652, virtualization management may cause the storage engine 632 for the compute instance 630 to identify the contiguous range of storage locations that stores the reassigned partition (e.g., by passing an address, reference or pointer to the range of storage locations) and cause the compute instance 630 to begin accessing the partition 652 in host storage 650 to service requests after making the partition accessible to the storage engine, in one embodiment.

Figure 7:
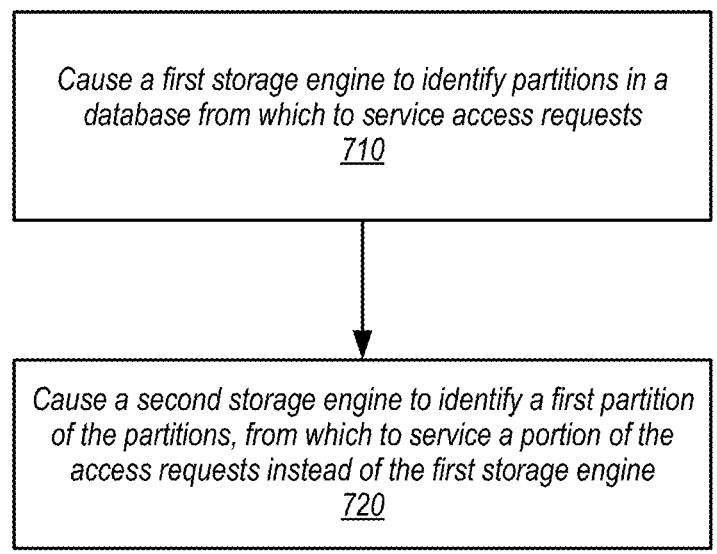
FIG. 7 is a high-level flowchart illustrating various methods and techniques to split processing responsibility for separately stored data partitions of a database, according to some embodiments.

The examples of splitting processing responsibility for separately stored data partitions as in FIGS. 2-6 have been given in regard to a database service (which may be a non-relational or NoSQL database service) and a virtual compute service. However, various other types of database systems, data processing systems, or virtual computing systems may implement splitting processing responsibility for separately stored data partitions, in other embodiments. FIG. 7 is a high-level flowchart illustrating various methods and techniques to split processing responsibility for separately stored data partitions of a database, according to some embodiments. These techniques may be implemented using various control plane or routing features as described above with regard to FIGS. 2-6, as well as for other types of databases, storage engines, systems, or clients and thus the following discussion is not intended to be limiting as to the other types of systems that may implement the described techniques.

As indicated at 710, a first storage engine may be caused to identify partitions in a database from which to service access requests, in some embodiments. For example, a first storage engine may establish a connection with a storage device that stores each partition of the database in an individual storage unit, in one embodiment. Pointers, file handles, references, or other object identifiers specifying the locations of the partitions in the storage units may be provided to the first storage engine. A partition map for the database may be provided, in one embodiment, to the first storage engine, indicating the locations of the partitions in storage. The first storage engine can then begin servicing access requests to the partitions after the partitions are identified at the first storage engine, in one embodiment.

As indicated at 720, a second storage engine may be caused to a identify a first partition of the partitions, from which to service a portion of the access requests instead of the first storage engine, in some embodiments. For example, a pointer, file handle, reference, or other object identifier specifying the location of the partition in a storage unit in storage may be provided to the second storage engine, in one embodiment. A partition map may be updated at the storage engine, in one embodiment, indicating a location of the storage unit storing the first partition. In some embodiments, access requests for the first partition may be directed to the second storage engine instead of the first storage engine after the second storage engine has identified the first partition. For example, the second storage engine, may send an acknowledgement to a request routing layer indicating that the second storage engine can access the first partition and begin processing access requests to the first partition. In one embodiment, a second storage engine can identify the first partition from which to service the access request upon receiving an access request for the first partition.

Figure 8:
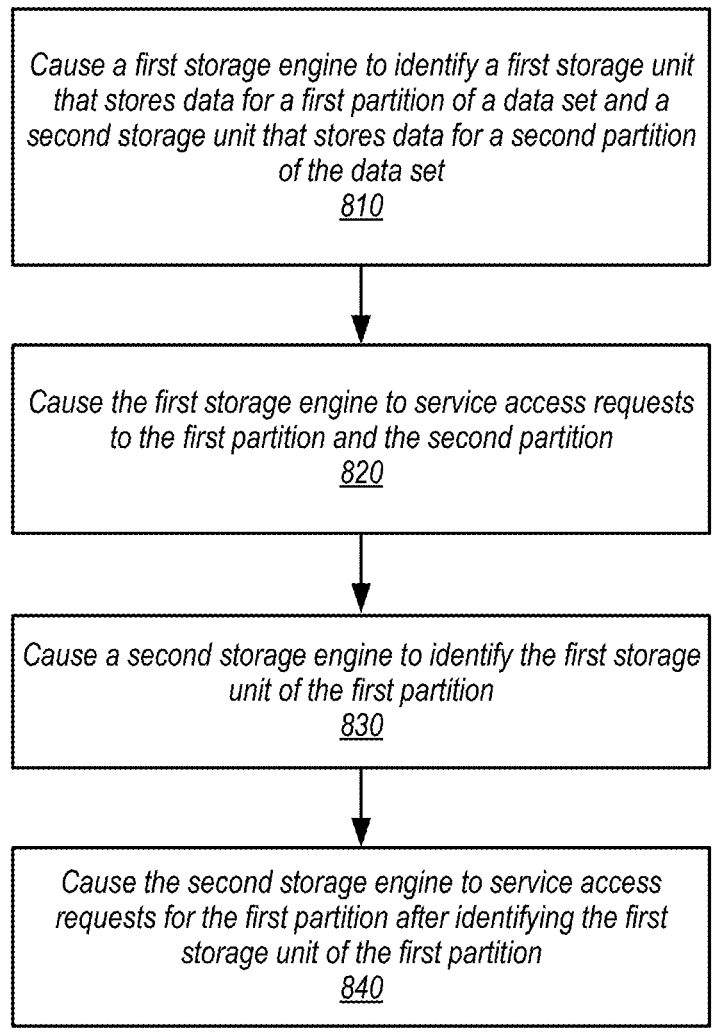
FIG. 8 is a high-level flowchart illustrating various methods and techniques to split processing responsibility for separately stored data partitions of a data set, according to some embodiments.

FIG. 8 is a high-level flowchart illustrating various methods and techniques to split processing responsibility for separately stored data partitions of a data set, according to some embodiments. As indicated at 810, a first storage engine may be caused to identify a first storage unit that stores data for a first partition of a data set and a second storage unit that stores data for a second partition of a data set. Identifying storage units may depend upon the implement of a storage unit, in different embodiments. If, for instance, a storage unit is a virtual, block-based storage volume, then identifying the storage unit may include sending a request to attach (e.g., by establishing a logical mapping between the first storage engine and a virtual block-based storage volume or by mounting the virtual block-based storage volume over a network connection between the storage system and the first storage engine). If, in another example, the storage unit is range of addresses in a memory, then a pointer, address, or other reference may be provided to the first storage engine to identify the first and storage units.

As indicated at 820, the first storage engine may be caused to service access requests to the first partition and the second partition, in some embodiments. For example, an assignment mapping or other metadata indicating the routing of requests to storage engines may identify the first storage engine as mapped to the first and second partitions. Assignment information may be hosted and enforced in a separate routing layer or system, or by hosts, instances, or platforms executing the first storage engine and other storage engines, such as the second storage engine, in one embodiment.

Figure 9:
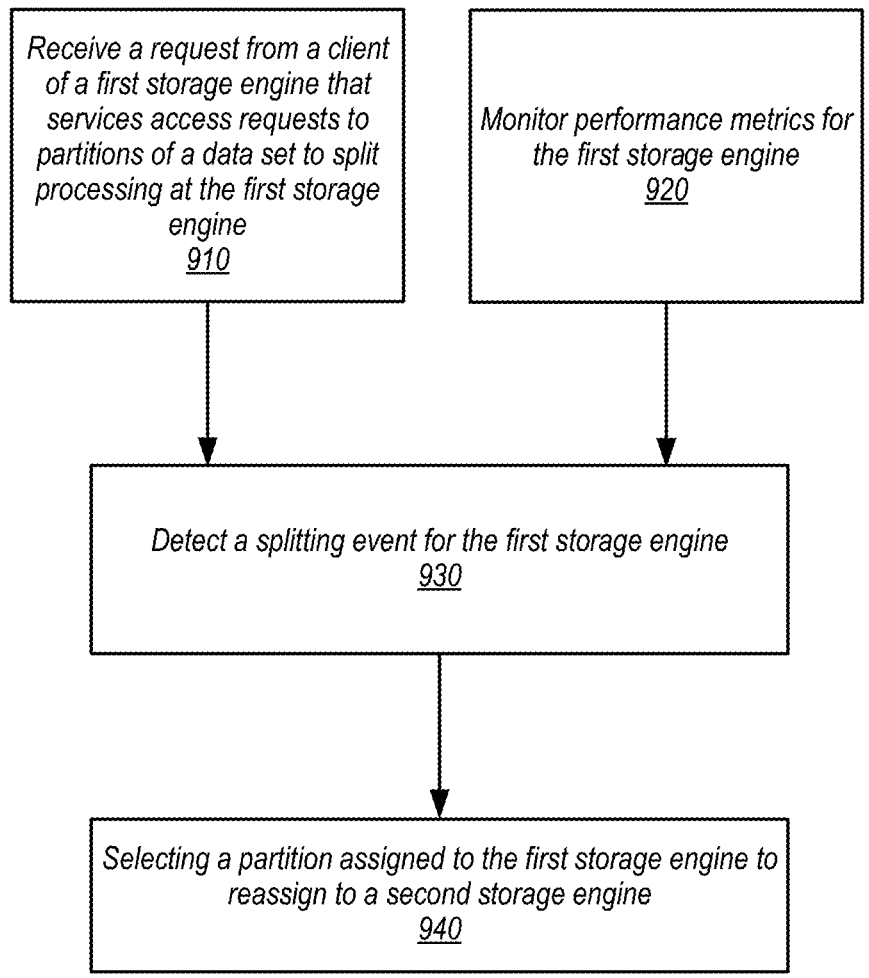
FIG. 9 is a high-level flowchart illustrating various methods and techniques to detect a split operation, according to some embodiments.

The first storage engine may continue processing access requests for the first and second partitions until a split event is detected for the first storage engine, as discussed below with regard to FIG. 9, in one embodiment. For example, one or multiple split criteria (e.g., defined by maximum or minimum threshold values, traffic count, free space ratio, or other performance criteria) may indicate that the first storage engine is overburdened (or the host, node, or platform executing the first storage engine). Split events may also be manually requests (e.g., by a client via an API command or an administrator via an admin API command), in one embodiment. In one embodiment, clients may specify split event criteria when provisioning the storage engine or creating the data set. A partition to reassign may then be selected, in one embodiment.

As indicated at 830, the second storage engine may be caused to identify the storage unit of the selected partition, in one embodiment. For instance, if the storage unit is identified by establishing a network connection or attaching or mounting a volume, storage device, or other data object, then the second storage engine may perform the requests or other steps to establish the network connection, attach or mount the volume, storage device, or other data object. In some embodiments, a virtual memory address, a pointer, or other reference indicating the location of the partition in storage may be provided to the second storage engine. The first storage engine may disconnect, detach, or unmount the storage unit (e.g., a virtual block-based storage volume), in some embodiments.

Similar to element 820 discussed above, once the second storage engine identifies the first storage unit, then the second storage engine may be caused to service access requests to the first partition, as indicated at 840 in one embodiment. For example, an assignment mapping or other metadata indicating the routing of requests to storage engines may identify the second storage engine as mapped to the first partition, in one embodiment.

The various techniques discussed above with regard to FIGS. 7 and 8 may be performed in response to various conditions, scenarios, or other events to reassign processing responsibility from one node or storage engine to another node or storage engine, in some embodiments. FIG. 9 is a high-level flowchart illustrating various methods and techniques to detect a split operation, according to some embodiments. As indicated at 910, a splitting event may be detect upon receiving a request from a client of a first storage engine that services access requests to partitions of a data set to split processing at the first storage engine, in some embodiments. A request to split processing may be formatted according to an API, command-line interface, graphical user interface (GUI), or other interface, one embodiment. The request may include an identifier of the storage engine for which processing is to be split. A splitting event for the first storage engine may be detected in response to receiving the request to split processing, as indicated at 930.

Other conditions or scenarios may trigger the detection of a splitting event, in one embodiment. For example, as indicated at 920, performance metrics for the first storage engine may be monitored, in one embodiment. Performance metrics may include metrics that indicated the utilization of resources (e.g., processor, network-bandwidth, I/O bandwidth, storage capacity, etc.), the amount of work being handled by a storage engine (e.g., a storage engine is averaging 4 access requests per second), or other information indicative of performance, in one embodiment. Performance metrics may be collected or specific to individual partitions assigned to a storage engine, in one embodiment. For example, performance metrics may track the number of access requests for each partition assigned to the first storage engine. Performance metrics for the first storage engine may be evaluated with respect to splitting event criteria, in one embodiment. Different metric thresholds, for instance, may be monitored so that if a metric exceeds the corresponding threshold for the metric, a splitting event can be triggered. Splitting event criteria may be defined according to default system values or may be specified by a user of the storage engine (e.g., via a performance request, selection of a throughput model, or other indication of storage engine performance), in one embodiment.

Once a splitting event is detected for the first storage engine, as indicated at 930, a partition (or multiple partitions) assigned to the first storage engine may be selected to reassign to a second storage engine, in some embodiments. For example, partition selection may be randomly performed (e.g., based on the assumption that each partition receives or creates equal work), in one embodiment. A random number generator may for, instance, be implemented to provide a selection value that can be mapped to a partition assigned to the storage engine. In one embodiment, a partition may be selected according to an evaluation of metrics collected with respect to the partitions at the storage engine. For example, "hot" partitions, though not necessarily large in size, may consume a disproportion number of resources and therefore may be identified by the metric evaluation for reassignment.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of splitting processing responsibility for separately stored data partitions as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s), in one embodiment.

System memory 1020 may be configured to store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

Figure 10:
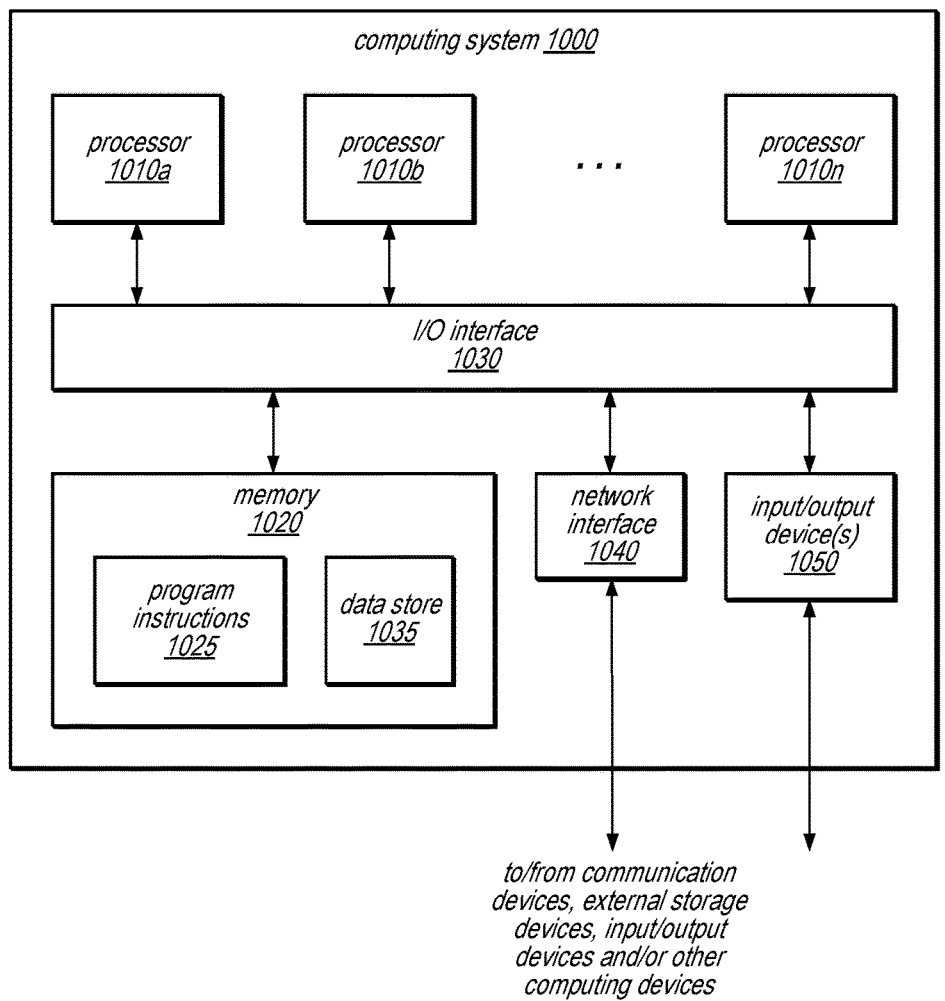
FIG. 10 is a block diagram illustrating an example computing system, according to some embodiments.

As shown in FIG. 10, memory 1020 may include program instructions 1025, configured to implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions that, if performed by at least one processor, cause the at least one processor to perform a method to at least:
a memory to store program instructions that, if performed by at least one processor, cause the at least one processor to perform a method to at least:
detect a splitting event for a first storage engine of a plurality of storage engines based, at least in part, on one or more performance metrics for the first storage engine; and
in response to the detection of the splitting event, move processing of access requests for a first partition of a database from the first storage engine to a second storage engine of the plurality of storage engines, wherein the first storage engine processes access requests for a plurality of partitions of the database including the first partition, wherein each of the partitions is the only partition stored in a respective storage unit, and wherein to move processing of the access request causes the at least one processor to:
cause the second storage engine to identify a location of the respective storage unit that stores the first partition of the plurality of partitions separate from the other partitions of the plurality of partitions; and
cause the second storage engine to process access requests for the first partition of the database, instead of the first storage engine, after the second storage engine identifies the location of the respective storage unit.

2. The system of claim 1, wherein to cause the second storage engine to identify a location of the respective storage unit that stores the first partition, and to cause the second storage engine to service the access requests to the first partition, instead of the first storage engine, comprises:
detach the respective storage unit that stores the first partition from the first storage engine, wherein the respective storage unit stores the first partition separate from other partitions of the plurality of partitions; and
attach the respective storage unit that stores the first partition to the second storage engine.

3. The system of claim 1, wherein the first storage engine and the second storage engine are implemented as part of a network-based database service, and wherein to cause the second storage engine to process access requests for the first partition of the database, instead of the first storage engine, comprises update a mapping of processing assignments of the plurality of nodes and the plurality of partitions to direct access requests for the first partition to the second storage engine after the second storage engine identifies the location of the respective storage unit that stores the first partition.

4. A method, comprising:
detecting a splitting event for a first storage engine based, at least in part, one or more performance metrics for the first storage engine; and
in response to detecting the splitting event, moving processing of access requests for a first partition of a data set from a first storage engine to a second storage engine, wherein the data set comprises a plurality of partitions, including the first partition and a second partition, wherein each of the partitions of the plurality of partitions is the only partition stored in a respective storage unit, and wherein the moving comprises:
causing the first storage engine to identify and service access requests to:
a first storage unit that stores data for the first partition of the data set; and
a second storage unit that stores data for the second partition of the data set, separate from the first partition;
causing the second storage engine to identify the first storage unit and service access requests to the first partition of the data set, instead of the first storage engine, after the second storage engine identifies the first storage unit.

5. The method of claim 4, further comprising:
receiving a request from a client of the first storage engine to split processing at the first engine; and
in response to receiving the request:
moving processing of access requests for a first partition of another data set from the first storage engine to a third storage engine, wherein the other data set comprises a plurality of partitions, including the first partition and a second partition, wherein each of the partitions of the plurality of partitions is the only partition stored in a respective storage unit, and wherein the moving comprises:
causing the first storage engine to identify and service access requests to:
a first storage unit that stores data for the first partition of the other data set; and
a second storage unit that stores data for the second partition of the other data set, separate from the first partition;
causing the third storage engine to identify the first storage unit and service access requests to the first partition of the other data set, instead of the first storage engine, after the third storage engine identifies the first storage unit.

6. The method of claim 4, wherein the causing the second storage engine to identify the first storage unit comprises:
detaching the first storage unit from the first storage engine; and
attaching the first storage unit to the second storage engine.

7. The method of claim 4, wherein the first unit of storage and the second unit of storage are implemented in a shared disk storage architecture.

8. The method of claim 4, further comprising selecting the first partition to reassign from the first storage engine to the second storage engine.

9. The method of claim 8, wherein selecting the first partition to reassign from the first storage engine to the second storage engine comprises evaluating one or more metrics collected for servicing access requests to the first partition and the second partition according to a load balancing scheme for processing access requests directed to the data set.

10. The method of claim 4, wherein the first unit of storage is a first range of contiguous storage locations in a memory, wherein the second unit of storage is a second range of contiguous storage locations in the memory, and wherein causing the second storage engine to identify the first storage unit comprises providing a reference to the range of contiguous storage locations in the memory to the second storage engine.

11. The method of claim 4, wherein the data set is a database, wherein the first partition and the second partition are different tables of the database or different portions of tables of the database, and wherein the first unit of storage and the second unit of storage are implemented in a network-accessible data store.

12. A non-transitory, computer-readable storage medium, storing program instructions that when executed by one or more computing devices cause the one or more computing devices to implement:
identifying, at a first node of a plurality of nodes:
a first storage unit that stores data for a first partition of a plurality of partitions of a data set separate from the other partitions of the plurality of partitions, wherein the data set comprises at least the first partition and a second partition of the data set; and
a second storage unit that stores data for the second partition separate from the first partition;
wherein the first node services access requests to the first partition and the second partition;
detecting a splitting event for the first node based, at least in part, one or more performance metrics for the first node; and
in response to detecting the splitting event, reassigning servicing of access requests to the first partition from the first node to a second node of the plurality of nodes, comprising:
making the first storage unit accessible to the second node; and
causing the second node to identify the first storage unit and service access requests to the first partition of the data set according to an updated mapping of processing assignments of the plurality of nodes and the plurality of partitions to direct access requests for the first partition to the second node after the second node can access the first storage unit.

13. The non-transitory, computer-readable storage medium of claim 12, wherein the program instructions further cause the one or more computing devices to implement:
identifying, at the first node of the plurality of nodes:
a first storage unit that stores data for a first partition of a plurality of partitions of another data set separate from the other partitions of the plurality of partitions, wherein the other data set comprises at least the first partition and a second partition of the other data set; and
a second storage unit that stores data for the second partition separate from the first partition;
wherein the first node services access requests to the first partition and the second partition;
receiving a request to split processing at the first node; and
in response to receiving the request, reassigning servicing of access requests to the first partition from the first node to a third node of the plurality of nodes, comprising:
making the first storage unit accessible to the third node; and
updating a mapping of processing assignments of the plurality of nodes and the plurality of partitions to direct access requests for the first partition to the third node after the third node can access the first storage unit.

14. The non-transitory, computer-readable storage medium of claim 12, wherein the first storage unit and the second storage unit are implemented in a shared nothing storage architecture.

15. The non-transitory, computer-readable storage medium of claim 12, wherein the program instructions further cause the one or more computing devices to implement determining the first partition as the partition to reassign from the first node.

16. The non-transitory, computer-readable storage medium of claim 12, wherein the program instructions cause the one or more computing devices to further implement storing, by the first node, the data of the first partition in the first storage unit and the data of the second partition in the second storage unit.

17. The non-transitory, computer-readable storage medium of claim 12, wherein the first unit of storage is a first range of contiguous storage locations in a memory, wherein the second unit of storage is a second range of contiguous storage locations in the memory, and wherein, in making the first storage unit accessible to the second node, the program instructions cause the one or more computing devices to implement providing a reference to the range of contiguous storage locations in the memory to the second node.

18. The non-transitory, computer-readable storage medium of claim 17, wherein the first node and the second node are implemented as part of a network-based computing service.

* * * * *